(12) United States Patent
Park

(10) Patent No.: US 9,791,915 B2
(45) Date of Patent: Oct. 17, 2017

(54) POWER CONTROL METHOD AND ELECTRONIC DEVICE SUPPORTING THE SAME

(71) Applicant: Samsung Electronics Co., Ltd., Suwon-si, Gyeonggi-do (KR)

(72) Inventor: Jinseok Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 14/729,527

(22) Filed: Jun. 3, 2015

(65) Prior Publication Data

US 2016/0011647 A1   Jan. 14, 2016

(30) Foreign Application Priority Data

Jul. 11, 2014   (KR) ........................ 10-2014-0087663

(51) Int. Cl.
| | |
|---|---|
| *G06F 1/32* | (2006.01) |
| *G06F 13/24* | (2006.01) |
| *G06F 9/44* | (2006.01) |
| *G06F 1/14* | (2006.01) |

(52) U.S. Cl.
CPC .............. *G06F 1/3287* (2013.01); *G06F 1/14* (2013.01); *G06F 9/4401* (2013.01); *G06F 13/24* (2013.01)

(58) Field of Classification Search
CPC .... G06F 1/3203; G06F 1/3237; G06F 1/3287; G06F 13/24
See application file for complete search history.

(56) References Cited

U.S. PATENT DOCUMENTS

| | | | | |
|---|---|---|---|---|
| 5,446,904 A | * | 8/1995 | Belt | G06F 1/24 710/1 |
| 6,965,796 B2 | * | 11/2005 | Kelly | A61N 1/3931 607/27 |
| 7,389,144 B1 | * | 6/2008 | Osorio | A61N 1/36142 607/29 |
| 7,411,314 B2 | * | 8/2008 | Dunstan | G06F 1/3203 307/64 |
| 7,685,466 B2 | * | 3/2010 | Dunstan | G06F 11/0793 713/323 |
| 7,730,541 B2 | * | 6/2010 | Kawaguchi | G06F 11/2015 320/167 |
| 9,471,121 B2 | * | 10/2016 | Saha | G06F 1/26 |
| 9,489,213 B2 | * | 11/2016 | Ma | G06F 9/442 |
| 2002/0143410 A1 | * | 10/2002 | Yance | G05B 19/0428 700/11 |
| 2008/0259742 A1 | | 10/2008 | Tadanori | |

FOREIGN PATENT DOCUMENTS

JP         2000214907 A      8/2000

* cited by examiner

*Primary Examiner* — Brian Misiura
(74) *Attorney, Agent, or Firm* — Jefferson IP Law, LLP

(57) ABSTRACT

A power control method of an electronic device is provided. The method includes receiving a power-on event in a power-off state of the electronic device and determining whether the received power-on event is a real time clock (RTC) interrupt. The method further includes determining, if the power-on event is the RTC interrupt, whether the power-off state is caused by an abnormal power-off, and performing, if the power-off state is caused by the abnormal power-off, a booting procedure.

15 Claims, 3 Drawing Sheets

POWER CONTROL METHOD AND ELECTRONIC DEVICE SUPPORTING THE SAME

CROSS-REFERENCE TO RELATED APPLICATION(S)

This application claims the benefit under 35 U.S.C. §119(a) of a Korean patent application filed on Jul. 11, 2014 in the Korean Intellectual Property Office and assigned Serial number 10-2014-0087663, the entire disclosure of which is hereby incorporated by reference.

TECHNICAL FIELD

The present disclosure relates to a power control method and an electronic device supporting the method.

BACKGROUND

With a remarkable growth of related technologies, a great variety of mobile electronic devices, e.g., smart phones, are increasingly popularized due to their high usability and good portability. More particularly, mobile electronic devices today outgrow their respective traditional fields and hence reach a mobile convergence stage in which a single mobile device has ability to support various user functions.

Meanwhile, in the electronic device, contact between a battery and a terminal of interface for receiving electric power from the battery may sometimes become loose. Unfortunately, this may cause a momentary disconnection, and thus the electronic device may fall into a power-off state. Since the user fails to recognize the power-off state of the electronic device, some issues may arise. For example, the user may not receive any important call, or in case of emergency, a serious time delay may occur until the electronic device is available for use.

Therefore, a need exists for a power control method for operating an electronic device in a normal state even when the electronic device falls unexpectedly into an abnormal power-off state.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a power control method for operating an electronic device in a normal state even when the electronic device falls unexpectedly into an abnormal power-off state.

Another aspect of the present disclosure is to provide an electronic device for supporting the power control method.

In accordance with an aspect of the present disclosure, a power control method of an electronic device is provided. The method includes receiving a power-on event in a power-off state of the electronic device, determining whether the received power-on event is a real time clock (RTC) interrupt, determining, if the power-on event is the RTC interrupt, whether the power-off state is caused by an abnormal power-off, and performing, if the power-off state is caused by the abnormal power-off, a booting procedure.

In accordance with another aspect of the present disclosure, an electronic device is provided. The electronic device includes an RTC and a control unit configured to receive a power-on event in a power-off state of the electronic device, to determine whether the received power-on event is an RTC interrupt, to determine, if the power-on event is the RTC interrupt, whether the power-off state is caused by an abnormal power-off, and to perform, if the power-off state is caused by the abnormal power-off, a booting procedure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a function" includes reference to one or more of such functions.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
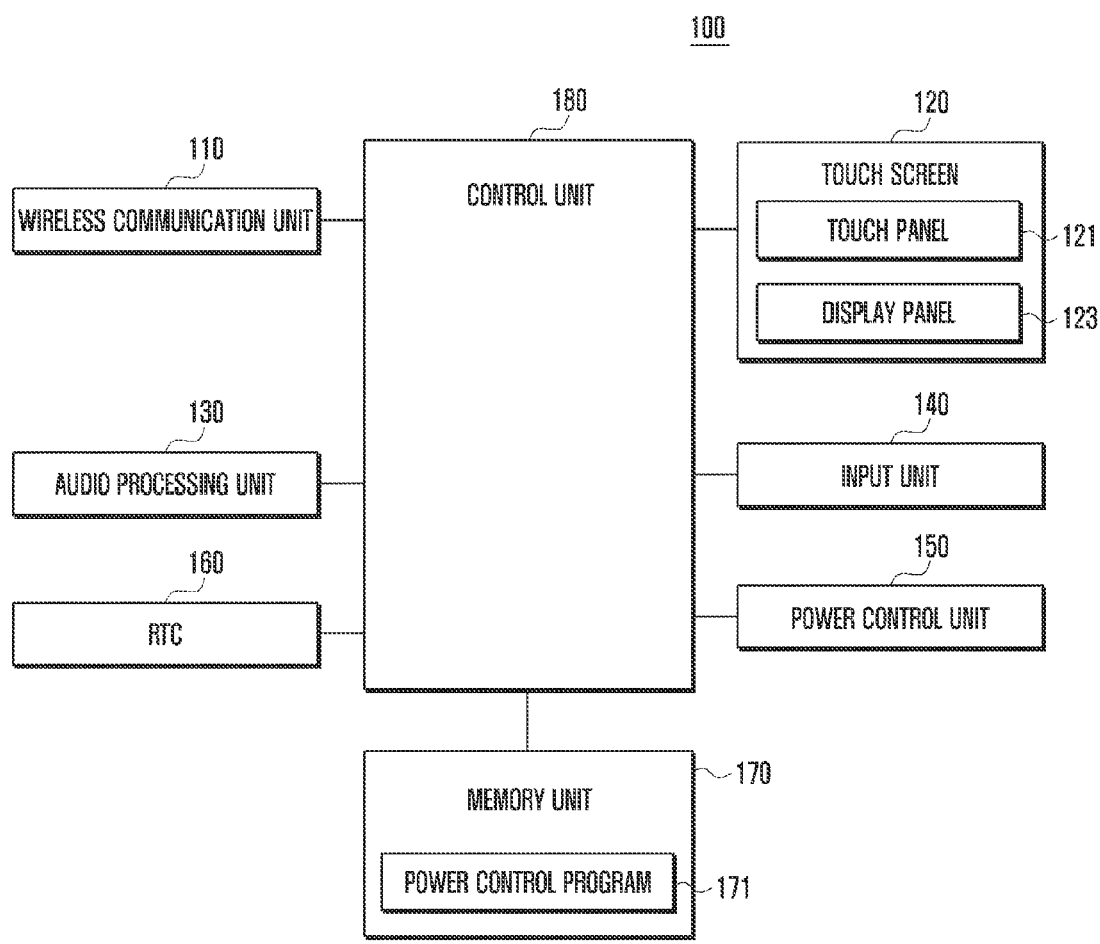
FIG. 1 is a block diagram illustrating an electronic device according to an embodiment of the present disclosure.

FIG. 1 is a block diagram illustrating an electronic device according to an embodiment of the present disclosure.

Referring to FIG. 1, an electronic device 100 may include, but not limited to, a wireless communication unit 110, a touch screen 120, an audio processing unit 130, an input unit 140, a power control unit 150, a Real Time Clock (RTC) 160, a memory unit 170, and a control unit 180.

The wireless communication unit 110 may establish a communication channel with a supportable network (e.g., a mobile communication network) under the control of the control unit 180. Further, the wireless communication unit 110 may transmit or receive a signal associated with a voice communication, a video communication, and data communication, such as a Short Message Service (SMS), a Multimedia Message Service (MMS), the Internet, and the like.

The wireless communication unit 110 may include a transceiver which up-converts the frequency of an outgoing signal and amplifies the signal and which amplifies with low-noise an incoming signal and down-converts the frequency of the signal. The wireless communication unit 110 may establish a data communication channel for a message service under the control of the control unit 180 and process data transmission or reception based on the message service.

The communication channel may include a mobile communication channel, such as Code Division Multiple Access (CDMA), Time Division Multiple Access (TDMA), Orthogonal Frequency Division Multiple Access (OFDMA), and the like, and a wired or wireless Internet communication channel. In case the electronic device 100 fails to support a communication function, the wireless communication unit 110 may be omitted.

The touch screen 120 may offer various screens, e.g., an idle screen, a menu screen, and the like, required for the operation of the electronic device 100. The touch screen 120 may include a touch panel 121 and a display panel 123. The touch panel 121 may be disposed on the display panel 123 (referred to as add-on type) or inserted in the display panel 123 (referred to as in-cell type).

The touch panel 121 may create a touch input signal in response to a user gesture on the screen, perform analog-to-digital conversion of the touch input signal, and transfer the signal to the control unit 180. The touch panel 121 may be a hybrid touch panel including a hand touch panel for detecting a hand gesture and a pen touch panel for detecting a pen gesture. The hand touch panel may be formed of capacitive type, resistive type, infrared type, or ultrasonic type.

The display panel 123 may display any kind of data or information on the screen under the control of the control unit 180. For example, when the control unit 180 processes (e.g., decodes) data and stores the processed data in a buffer, the display panel 123 may convert the stored data into an analog signal and display the processed data on the screen.

In an embodiment of the present disclosure, the display panel 123 may display a specific screen for selecting whether to execute a particular function for preventing abnormal power-off under the control of the control unit 180. For example, when a user triggers a function setting application to prevent abnormal power-off, the display panel 123 may display a selectable button, and the like, for selecting activation or inactivation of a function to prevent abnormal power-off under the control of the control unit 180.

In an embodiment of the present disclosure, if it is ascertained that the electronic device 100 falls in a power-off state abnormally, the display panel 123 may output a message for notifying the abnormal power-off of the electronic device 100 under the control of the control unit 180.

The display panel 123 may be formed of Liquid Crystal Display (LCD), Active Matrix Organic Light Emitting Diode (AMOLED), Passive Matrix Organic Light Emitting Diode (PMOLED), flexible display, transparent display, and the like.

The audio processing unit 130 may output various audio data defined in connection with the operation of the electronic device 100, caused by the playback of an audio file stored in the memory unit 170, or received from any external entity. In addition, the audio processing unit 130 may support an audio data collection function. Moreover, the audio processing unit 130 may include a speaker and a microphone. In an embodiment of the present disclosure, the audio processing unit 130 may output a notification sound when an abnormal power-off prevention function of the electronic device 100 is executed. In another embodiment of the present disclosure, if it is ascertained that the electronic device 100 falls in a power-off state abnormally, the audio processing unit 130 may output a notification sound or sound effect under the control of the control unit 180. For example, such a notification sound may be as follows: "The system was restarted due to abnormal power-off". In some cases, such a notification sound or sound effect may be unavailable depending on user's setting.

The input unit 140 may receive various kinds of information from a user and create a corresponding input signal. The input unit 140 may have a plurality of input keys and function keys for setting various functions. The functions keys may have navigation keys, side keys, shortcut keys, and the like. Additionally, the input unit 140 may create a key signal associated with a user's setting or with a function control of the electronic device 100, and transmit the key signal to the control unit 180. Such key signals may include a power on/off signal, a volume adjusting signal, a screen on/off signal, and the like. The input unit 140 may be formed of one or any combination of a qwerty keypad, a 3*4 keypad, a 4*3 keypad, a ball joystick, an optical joystick, a wheel key, a touch key, a touch pad, and the touch screen 120. In case the electronic device 100 supports a full touch screen, the input unit 140 may merely include a volume key, a screen on/off key, and a power on/off key, which are disposed on lateral sides of a case of the electronic device 100.

The power control unit 150 may control (or manage) power of the electronic device 100. Although not shown, the power control unit 150 may include, for example, a Power Management Integrated Circuit (PMIC), a charger IC, and/or a battery or fuel gauge.

The RTC 160 may create time information. The RTC 160 may include a plurality of registers, which may store therein time information, alarm information defined as periodic alarm or specific time, and the like. Although the RTC 160 is shown as a separate element in FIG. 1, the RTC 160 may be contained in the control unit 180 or the power control unit 150.

In an embodiment of the present disclosure, the RTC 160 may store interrupt setting information in at least parts of the plurality of registers under the control of the control unit 180. For example, the control unit 180 may control the registers of the RTC 160 to store therein RTC interrupt setting information so that an RTC interrupt can occur periodically or at a specific time point. Although not shown in FIG. 1, the electronic device 100 may include an auxiliary battery for continuously supplying electric power to the RTC 160 so as to prevent the loss of time information or RTC interrupt information stored in the RTC 160 (or generated at the RTC) in a power-off state.

The memory unit 170 is a secondary memory of the control unit 180 and may include a disk, a Random Access Memory (RAM), or a flash memory. Under the control of the control unit 180, the memory unit 170 may store therein an Operating System (OS) for the operation of the electronic device 100 and various types of data or information created at the electronic device 100 or received from any external entity (e.g., a server, a desktop Personal Computer (PC), other mobile device, and the like) through the wireless communication unit 110 or any other interface (not shown).

In an embodiment of the present disclosure, the memory unit 170 may include a register having therein a flag for ascertaining an abnormal power-off state of the electronic device 100. For example, in case of a normal power-off state of the electronic device 100 (e.g., in case a user inputs a power-off signal), the flag may be changed from the off-state (or the reset state) to the on-state (or the set state) under the control of the control unit 180. Contrary to that, in case of an abnormal power-off state of the electronic device 100, the flag may maintain the off-state. In an embodiment of the present disclosure, the register having such a flag may be contained in a nonvolatile memory, which may store flag setting information even when the supply of power is stopped (or even in a power-off state). For example, the nonvolatile memory may include at least one of Read Only Memory (ROM), NAND flash, NOR flash, Hard Disk Drive (HDD), Solid State Drive (SSD), or any other equivalent.

In an embodiment of the present disclosure, the memory unit 170 may include therein a power control program 171. The power control program 171 may contain a routine for setting an abnormal power-off prevention function, a routine for changing a setting state of the flag from the off-state (or the reset state) to the on-state (or the set state) in case of a normal power-off state, a routine for determining, from a flag setting state, whether a power-off state of the electronic device 100 has been caused abnormally when the state of the electronic device 100 is changed to a power-on state by an RTC interrupt, and a routine for changing the state of the electronic device 100 to the power-off state or performing a booting procedure, depending on whether the power-off state of the electronic device 100 has been caused abnormally.

The control unit 180 may control the overall operation of the electronic device 100 and a signal flow between internal elements of the electronic device 100, and process related data.

When electric power is supplied, the control unit 180 may perform a booting procedure. For example, the control unit 180 may load the OS stored in the memory unit 170 and, by using the loaded OS, perform a process for operating the respective elements of the electronic device 100. When the booting procedure is completed, the control unit 180 may initialize the respective elements of the electronic device 100.

In an embodiment of the present disclosure, the control unit 180 may set an RTC interrupt and also set a power-off flag to the off-state (or the reset state). For example, the control unit 180 may set the RTC interrupt so that the RTC interrupt can occur periodically or at a specific time point. The control unit 180 may control the registers of the RTC 160 to store therein information about the set RTC interrupt. In an embodiment of the present disclosure, if the RTC interrupt is set to occur periodically, the control unit 180 may control an RTC interrupt to occur at the next periodic time point when a certain RTC interrupt periodic time point arrives during a normal operation of the electronic device 100.

In an embodiment of the present disclosure, the control unit 180 may set the power-off flag to ascertain whether a power-off state of the electronic device 100 has been caused abnormally. For example, if the power-off state of the electronic device 100 is caused normally (e.g., when a user inputs a power-off signal), the control unit 180 may change a setting state of the flag from the off-state (or the reset state) to the on-state (or the set state). Additionally, if the power-off state of the electronic device 100 is caused abnormally, the control unit 180 may maintain a setting state of the flag to the off-state.

In an embodiment of the present disclosure, the control unit 180 may determine whether a normal power-off event is received. For example, the normal power-off event may be a power-off signal created when a user presses a power-off button. This is, however, exemplary only, and any other input for turning off the power of the electronic device 100 by a user's intention may be considered as the normal power-off event. If any normal power-off event is not received, the control unit 180 may maintain the RTC interrupt setup and the power-off flag setup and also maintain a normal operation of the electronic device 100. If any normal power-off event is received, the control unit 180 may change a setting state of the flag from the off-state (or the reset state) to the on-state (or the set state). Further, based on the normal power-off event, the control unit 180 may control the electronic device 100 to enter a power-off state.

In an embodiment of the present disclosure, when the electronic device 100 receives a power-on event in a power-off state, the control unit 180 may determine whether the received power-on event is an RTC interrupt. For example, based on RTC time information and RTC interrupt setting information, the control unit 180 may determine whether an RTC interrupt occurs according to the arrival of an RTC interrupt periodic time point or a certain specific time point. In addition, in case the RTC interrupt periodic time point or the certain specific time point does not arrive, the control unit 180 may determine whether the received power-on event is caused by a user's power-on input.

In an embodiment of the present disclosure, if the power-on event is the RTC interrupt, the control unit 180 may determine a setting state of the power-off flag. If the power-off flag is set to the on-state (or the set state), the control unit 180 may control the electronic device 100 to be in a power-off state without performing a booting procedure. For example, if the flag is set to the on-state, the on-state indicates that the power-off state of the electronic device 100 has been caused by a normal power-off event. Therefore, the control unit 180 may maintain the power-off state of the electronic device 100 without performing a booting procedure.

In an embodiment of the present disclosure, if the power-off flag is set to the off-state, the control unit 180 may control the electronic device 100 to perform a booting procedure. For example, if the power-off state of the electronic device 100 is caused abnormally, the power-off flag may maintain the off-state. Based on this flag state, the control unit 180 may ascertain that the power-off state of the electronic device 100 has been caused abnormally. Thereafter, the control unit 180 may perform a booting procedure. For example, the control unit 180 may load the OS stored in the memory unit 170 and, by using the loaded OS, perform a process for operating the respective elements of the electronic device 100.

In an embodiment of the present disclosure, if the received power-on event is not the RTC interrupt, the control unit 180 may control the electronic device 100 to perform a booting procedure. For example, if the power-on event is caused by a user's power-on input rather than the RTC interrupt, the control unit 180 may immediately perform a booting procedure even before the arrival of the RTC interrupt periodic time point or the certain specific time point.

Figure 2:
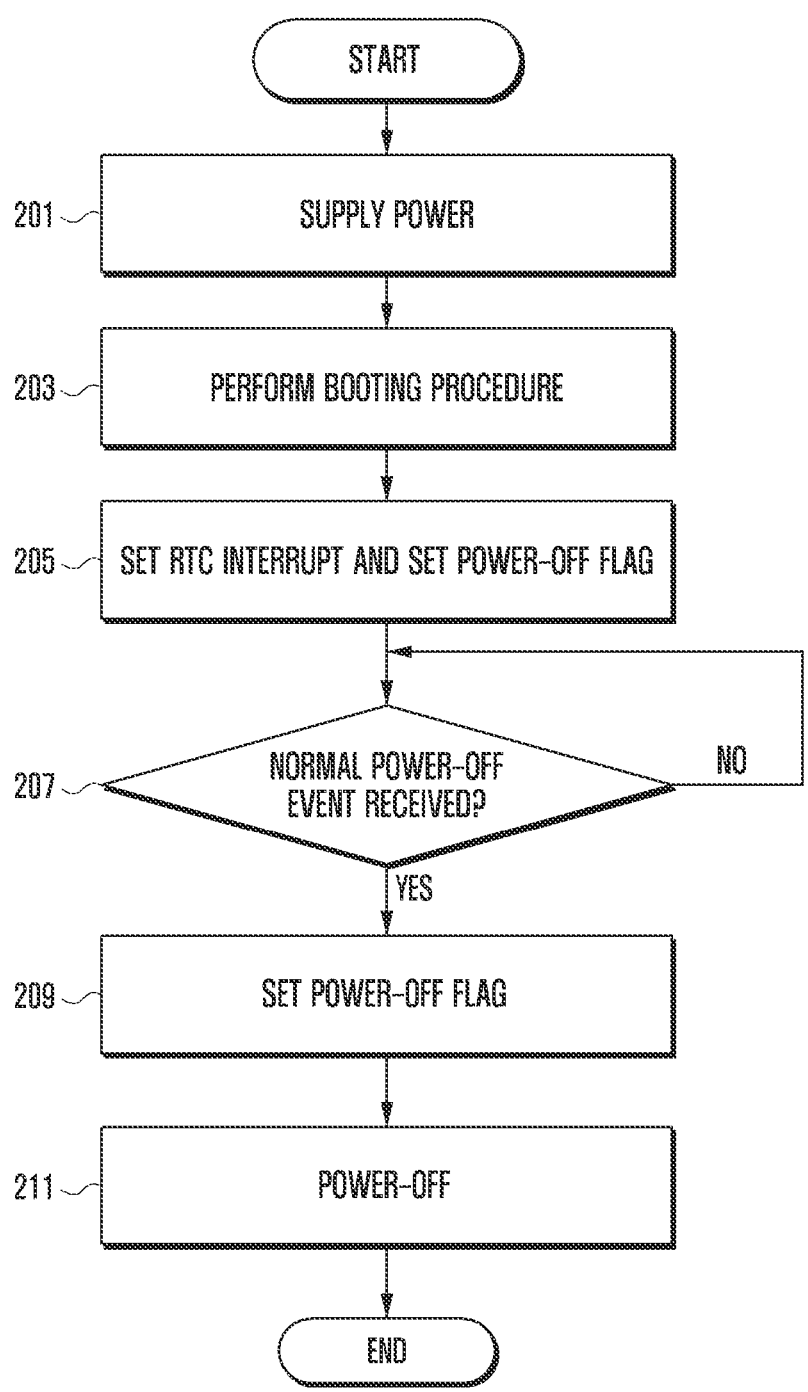
FIG. 2 is a flowchart illustrating a power control setup of an electronic device according to an embodiment of the present disclosure.

FIG. 2 is a flowchart illustrating a power control setup of an electronic device according to an embodiment of the present disclosure.

Referring to FIG. 2, when electric power is supplied at operation 201, the control unit 180 may perform a booting procedure at operation 203. For example, the control unit 180 may load the OS stored in the memory unit 170 and, by using the loaded OS, perform a process for operating the respective elements of the electronic device 100. Electric power is supplied when a battery is mounted on the electronic device 100 and a key input is received or when a power cable is connected with the electronic device 100 and a power-on event is received. When the booting procedure is completed, the control unit 180 may initialize the respective elements of the electronic device 100.

At operation 205, the control unit 180 may set an RTC interrupt and also set a power-off flag to the off-state (or the reset state).

In an embodiment of the present disclosure, the control unit 180 may set the RTC interrupt so that the RTC interrupt can occur periodically or at a specific time point. The control unit 180 may control the registers of the RTC 160 to store therein information about the set RTC interrupt. In an embodiment of the present disclosure, if the RTC interrupt is set to occur periodically, the control unit 180 may control an RTC interrupt to occur at the next periodic time point when a certain RTC interrupt periodic time point arrives during a normal operation of the electronic device 100. In an embodiment of the present disclosure, if the RTC interrupt is set to occur periodically or at a specific time point and even if the power-off state of the electronic device 100 is caused abnormally, RTC interrupt information and RTC time information may be not removed. For example, in case the power-off state of the electronic device 100 is caused abnormally, the RTC may be supplied with electric power through an auxiliary battery, and the like. If a periodic time point or a certain specific time point arrives in the abnormal power-off state, the electronic device 100 may be changed from the power-off state to the power-on state by an RTC interrupt.

In an embodiment of the present disclosure, the control unit 180 may set the power-off flag to ascertain whether a power-off state of the electronic device 100 has been caused abnormally. For example, if the power-off state of the electronic device 100 is caused normally (e.g., when a user inputs a power-off signal), the control unit 180 may change a setting state of the flag from the off-state (or the reset state) to the on-state (or the set state). Additionally, if the power-off state of the electronic device 100 is caused abnormally, the control unit 180 may maintain a setting state of the flag to the off-state. In an embodiment of the present disclosure, the power-off flag may be stored in a nonvolatile memory. Since the power-off flag is stored in a nonvolatile memory (e.g., a ROM) even in the power-off state of the electronic device 100, a flag setting state may be maintained even when the power-off state of the electronic device 100 is caused abnormally.

At operation 207, the control unit 180 may determine whether a normal power-off event is received. For example, the normal power-off event may be a power-off signal created when a user presses a power-off button. This is, however, exemplary only, and any other input for turning off the power of the electronic device 100 by a user's intention may be considered as the normal power-off event. If any normal power-off event is not received at operation 207, the control unit 180 may maintain the RTC interrupt setup and the power-off flag setup and also maintain a normal operation of the electronic device 100. Although not shown in FIG. 2, the electronic device 100 may fall into a power-off state regardless of a user's intention in case a momentary disconnection occurs, for example, in case a terminal of interface for receiving electric power from a battery is disconnected with the battery.

If any normal power-off event is received at operation 207, the control unit 180 may change a setting state of the flag from the off-state (or the reset state) to the on-state (or the set state) at operation 209.

At operation 211, the control unit 180 may control the electronic device 100 to enter a power-off state.

Figure 3:
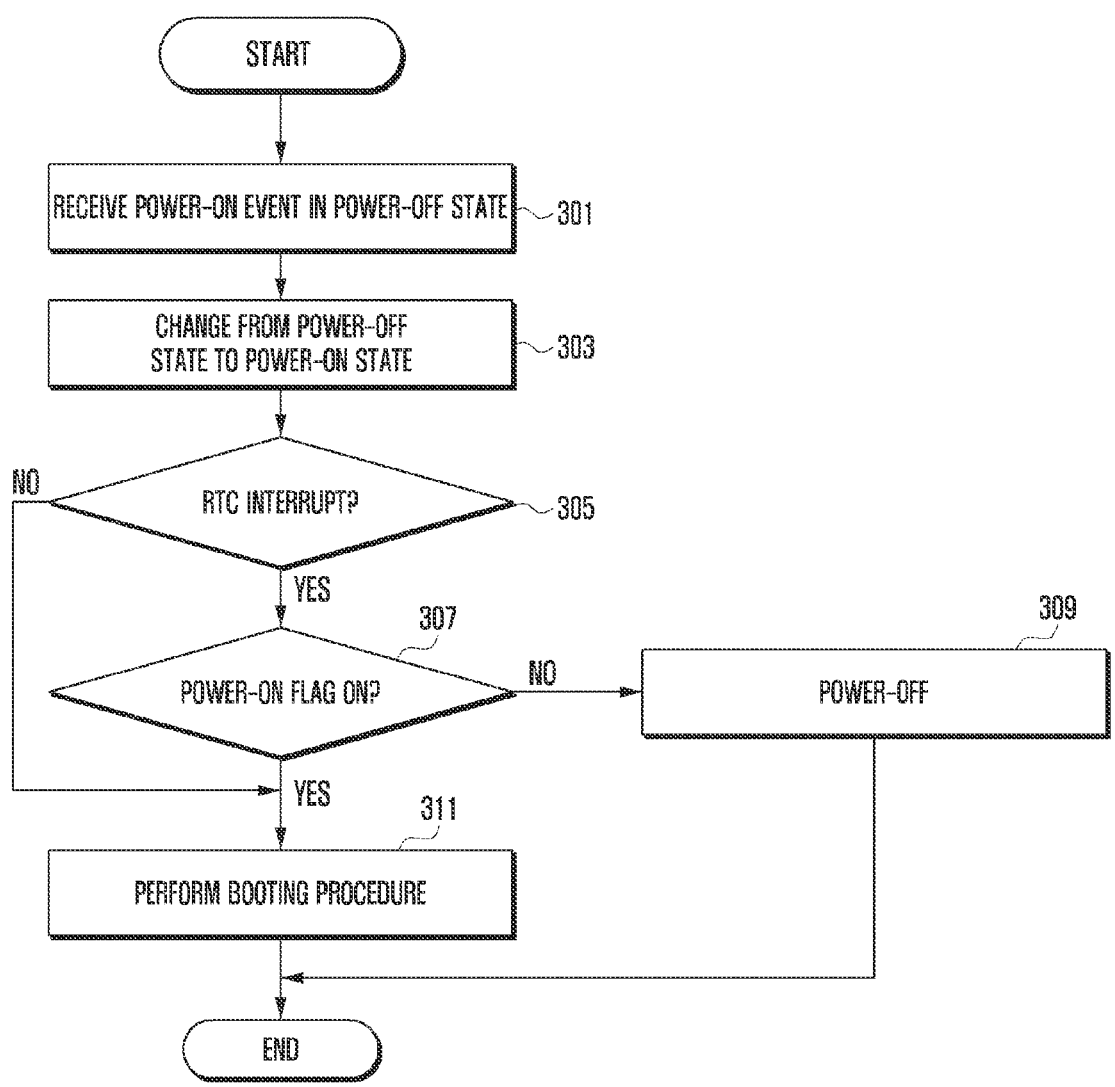
FIG. 3 is a flowchart illustrating a power control method of an electronic device according to an embodiment of the present disclosure.

FIG. 3 is a flowchart illustrating a power control method of an electronic device according to an embodiment of the present disclosure. The power control method shown in FIG. 3 will be described on the assumption that an RTC interrupt and a power-off flag state have been set up (e.g., the power-off flag has been set to the off-state) for preventing any abnormal power-off.

Referring to FIG. 3, at operation 301, the electronic device 100 may receive a power-on event in a power-off state. In an embodiment of the present disclosure, the power-on event may be a user's power-on input, a connection between the electronic device 100 and any external device (e.g., a Universal Serial Bus (USB) device), or an RTC interrupt. This is, however, exemplary only, and any other event for turning on the power of the electronic device 100 may be considered as the power-on event.

At operation 303, the electronic device 100 may be changed from the power-off state to the power-on state. For example, when the power-on event is received, electric power may be supplied to at least parts of elements of the electronic device 100, including the control unit 180, from a battery, and the like.

At operation 305, the control unit 180 may determine whether the power-on event is an RTC interrupt. For example, based on RTC time information and RTC interrupt setting information, the control unit 180 may determine whether an RTC interrupt occurs according to the arrival of an RTC interrupt periodic time point or a certain specific time point. In addition, in case the RTC interrupt periodic time point or the certain specific time point does not arrive, the control unit 180 may determine whether the received power-on event is caused by a user's power-on input.

If the power-on event is the RTC interrupt at operation 305, the control unit 180 may determine a setting state of the power-off flag at operation 307.

If the power-off flag is set to the on-state (or the set state) at operation 307, the control unit 180 may control the electronic device 100 to be in a power-off state without performing a booting procedure at operation 309. For example, if the flag is set to the on-state, the on-state indicates that the power-off state of the electronic device 100 has been caused by a normal power-off event as shown in operation 207 of FIG. 2. Therefore, the control unit 180 may change again the state of the electronic device 100 to the power-off state without performing a booting procedure.

If the power-off flag is set to the off-state at operation 307, the control unit 180 may control the electronic device 100 to perform a booting procedure at operation 311. For example, if the power-off state of the electronic device 100 is caused abnormally, the power-off flag may maintain the off-state. Based on this flag state, the control unit 180 may ascertain that the power-off state of the electronic device 100 has been caused abnormally. Thereafter, the control unit 180 may perform a booting procedure. For example, the control unit 180 may load the OS stored in the memory unit 170 and, by using the loaded OS, perform a process for operating the respective elements of the electronic device 100.

Meanwhile, if the received power-on event is not the RTC interrupt at operation 305, the control unit 180 may control the electronic device 100 to perform a booting procedure at operation 311. For example, if the power-on event is caused by a user's power-on input rather than the RTC interrupt, the control unit 180 may immediately perform a booting procedure even before the arrival of the RTC interrupt periodic time point or the certain specific time point.

The above-discussed electronic device 100 may further include various additional modules, such as a short-range communication module, a wired or wireless communication interface, an internet communication module, a digital broadcast receiving module, and the like. According to a digital convergence tendency today, such elements may be varied, modified and improved in various ways, and any other elements equivalent to the above elements may be additionally or alternatively equipped in the electronic device 100. As will be understood by those skilled in the art, some of the above-mentioned elements in the electronic device 100 may be omitted or replaced with another.

As discussed hereinbefore, even though the electronic device falls unexpectedly into an abnormal power-off state, the above-discussed power control method may allow the electronic device to operate in a normal state.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A power control method of an electronic device, the method comprising:
   receiving a power-on event in a power-off state of the electronic device;
   determining whether the received power-on event is a real time clock (RTC) interrupt;
   determining, if the power-on event is the RTC interrupt, whether the power-off state is caused by an abnormal power-off based on a flag for ascertaining the abnormal power-off; and
   performing, if the power-off state is caused by the abnormal power-off, a booting procedure,
   wherein the flag is set to an off-state when the electronic device performs a booting procedure.

2. The method of claim 1, further comprising:
   setting the RTC interrupt and the flag.

3. The method of claim 2, wherein the setting of the RTC interrupt and the flag comprises setting the RTC interrupt so that the RTC interrupt occurs periodically or at a specific time point.

4. The method of claim 1, wherein the setting of the RTC interrupt and the flag further comprises setting the flag to an on-state when the electronic device receives a normal power-off event.

5. The method of claim 4, wherein the determining of whether the power-off state is caused by the abnormal power-off comprises determining whether the flag maintains the off-state.

6. The method of claim 1, further comprising:
   maintaining, if the power-off state is caused by a normal power-off, the power-off state of the electronic device.

7. The method of claim 1, further comprising:
   performing, if the received power-on event is not the RTC interrupt, the booting procedure.

8. An electronic device comprising:
   a real time clock (RTC); and
   a control unit configured to:
      receive a power-on event in a power-off state of the electronic device,
      determine whether the received power-on event is an RTC interrupt,
      determine, if the power-on event is the RTC interrupt, whether the power-off state is caused by an abnormal power-off based on a flag for ascertaining the abnormal power-off,
      perform, if the power-off state is caused by the abnormal power-off, a booting procedure, and
      set the flag to an off-state when the electronic device performs a booting procedure.

9. The electronic device of claim 8, wherein the control unit is further configured to set the RTC interrupt and the flag.

10. The electronic device of claim 9, wherein the control unit is further configured to set the RTC interrupt so that the RTC interrupt occurs periodically or at a specific time point.

11. The electronic device of claim 8, wherein the control unit is further configured to set the flag to an on-state when the electronic device receives a normal power-off event.

12. The electronic device of claim 11, wherein the control unit is further configured to determine whether the flag maintains the off-state.

13. The electronic device of claim 8, wherein the control unit is further configured to maintain, if the power-off state is caused by a normal power-off, the power-off state of the electronic device.

14. The electronic device of claim 8, wherein the control unit is further configured to perform, if the received power-on event is not the RTC interrupt, the booting procedure.

15. At least one non-transitory computer readable storage medium for storing a computer program of instructions configured to be readable by at least one processor for instructing the at least one processor to execute a computer process for performing the method of claim 1.

* * * * *